Patented Mar. 7, 1950

2,499,984

UNITED STATES PATENT OFFICE 2,499,984

OILY COMPLEX ESTERS

Ellington M. Beavers and Richard F. Conyne, Philadelphia, Pa., assignors to Rohm & Haas Company, Philadelphia, Pa., a corporation of Delaware No Drawing. Application December 16, 1948, Serial No. 65,716

12 Claims. (Cl. 260—485)

This invention relates to bland, oily complex esters having low freezing points, low volatility, high flash and fire points, viscosities favorable for lubricating and good viscosity-temperature relationships. It also concerns a process for preparing these complex esters. It deals, furthermore, with lubricants and lubricating compositions based on these complex esters and methods of lubricating with these composition.

Considerable effort has been expended in the quest for a liquid which would be fluid at relatively low temperatures, yet not be readily volatile, and at the same time possess lubricating properties and viscosities over a range of temperatures which would render the fluid useful as a lubricating medium over this range. Hydrocarbons which exhibit low pour points tend to be excessively volatile and have low flash and fire points. Hydrocarbons which remain fluid at temperatures much below 0° F. lack body and lubricity. Various synthetic chemicals have been suggested to replace hydrocarbons as lubricants and, indeed, some of these present definite advantages over hydrocarbon liquids for specific applications. Even so, there remains much to be desired in the best of the chemical compounds which have thus far been suggested to serve as lubricants.

With regard to materials which have previously been made through utilization of the ester linkage, there are on the one hand resins of the alkyd type and on the other simple or mixed carboxylic esters, both of which lack the properties provided by the compounds of the present invention. Neither the choice of reactants of the prior art nor the mode of their combination permits manufacture of products having the combination of properties now made possible through the present invention.

To produce bland, oily complex esters having the combination of properties recited above, it is necessary to take the dibasic acids, glycols, and monohydric alcohols which are defined below, to mix them in proportions providing an excess of both glycol and alcohol on the basis of equivalents, to react them by heating to promote esterification and then transesterification, taking off the excess of glycol and alcohol, to heat the reaction mixture to 195° C. to 205° C., preferably 200° C., and to reduce the pressure of the reaction mixture at this temperature range below 30 mm. The reaction is continued until the resulting product has an acid number approaching zero. For practical purposes the reaction is carried on until the acid and hydroxyl numbers are individually less than two.

During the reaction alcohol and glycol are distilled out of the reaction mixture as it is heated and heating is continued until the product, as shown by hydrolysis to its component parts, contains residues of alcohol, glycol, and acid in proportions such that the condition is fulfilled as defined by the equation $$x+2y=2z$$

and the molar ratio of alcohol to glycol to acid as condensed together comes within the limits of 1.2/0.4/1 and 0.8/0.6/1. In the above equation $x$ represents moles of alcohol, $y$ moles of glycol, and $z$ moles of dibasic acid.

The acids which are used in forming the products of this invention are azelaic and sebacic acid. Mixtures of these acids may also be used.

The glycols which are used are acyclic, saturated, non-tertiary dihydric alcohols of seven to ten carbon atoms in branched chain arrangement. Of such glycols, those available through common reactions are primarily 1,3-diols and these are particularly useful for the preparation of the products of this invention. Typical glycols which may be used are:

2-ethyl-1,3-pentanediol,
2,4-dimethyl-1,3-pentanediol,
2,2-diethyl-1,3-propanediol,
2-isopropyl-2-methyl-1,3-propanediol,
2-isobutyl-2-methyl-1,3-propanediol,
2-tert.-butyl-2-methyl-1,3-propanediol,
2-ethyl-2-isopropyl-1,3-propanediol,
2-ethyl-1,3-hexanediol,
2-isopropyl-1,3-pentanediol,
2-ethyl-4-methyl-1,3-pentanediol,
2,5-dimethyl-1,3-hexanediol,
2-methyl-1,3-octanediol,
2-ethyl-1,3-heptanediol,
2-isopropyl-1,3-hexanediol,
2-ethyl-2-tert.-butyl-1,3-propanediol,
2-methyl-2-neopentyl-1,3-propanediol,
2-amyl-2-ethyl-1,3-propanediol,
2-tert.-butyl-2-isopropyl-1,3-propanediol,
2-isopropyl-4,4'-dimethyl-1,3-pentanediol, and
2-hexyl-2-methyl-1,3-propanediol.

In these glycols the alcoholic hydroxyl groups are attached at primary or secondary carbon atoms and the carbon atoms are in branched chain arrangement relative to the position of hydroxyl groups. Many of the glycols illustrated are obtainable from olefins through the "oxo" reaction with carbon monoxide and hydrogen and reaction of the intermediate aldehyde with formaldehyde. Mixtures of glycols may be used as well as single glycols.

Typical of the monohydric, saturated, aliphatic alcohols of six to nine carbon atoms in branched chain arrangement are:

2-methylpentanol,
2-ethylbutanol,
2,3-dimethylbutanol,
1,4-dimethyl-2-pentanol,
4-methylpentanol,
4-methyl-2-pentanol,
5-methylhexanol,
5-methyl-2-hexanol,
2,4-dimethylpentanol,
3,4-dimethylpentanol,
2,2,3-trimethylbutanol,
2,2,4-trimethylpentanol,
2-isopropyl-3-methylbutanol,
3,5-dimethylpentanol,
2-ethylpentanol,
2-heptanol,
2-methylhexanol,
4-methyl-2-hexanol,
2-hexanol,
4-methyl-3-hexanol,
2-isopropyl-3,3-dimethylbutanol,
2,2,4,4-tetramethylpentanol,
6-methyl-2-octanol,
5-methyl-2-octanol,
5,5-dimethyl-2-pentanol,
3,3-dimethylheptanol,
2-propyl-3,3-dimethylbutanol,
1-methyl-5,5-dimethylhexanol,
7-methyl-2-octanol, or
4,5-dimethyl-2-heptanol These alcohols are non-tertiary. They may be used as single, pure alcohols or as mixtures. Many of the alcohols are obtainable through the "oxo" reaction of olefins with carbon monoxide and hydrogen in the presence of a cobalt catalyst. Alcohols obtained from the reaction of carbon monoxide and hydrogen on an alkaline catalyst may also be used in the preparation of the products of this invention. The alcohols used are non-tertiary; that is, the hydroxyl group is attached to a primary or a secondary carbon atom. The carbon chain is branched with respect to the hydroxyl group.

The initial charge to the reaction vessel should comprise an excess of glycol and monohydric alcohol over that required on a basis of chemical equivalency for the dibasic acid. In general, the ratio of alcohol to glycol at the start may be taken between 4 to 1 and 1 to 2. The optimum starting ratio for yielding a final product having all the component parts in the needed proportions depends upon a number of factors. These are the choice of monohydric alcohol and glycol, the conditions of reaction, and the apparatus. Some of the alcohols and glycols are more volatile or less stable than others and require relatively larger proportions at the start than in the case of less volatile components. There is usually a difference in volatility of monohydric alcohol and glycol which may be compensated for by proper proportioning. The amount of each component which is lost from the reaction mixture will depend in part upon the particular schedule followed in respect to time, temperature, rate of heating, rate of refluxing and condensing, and like factors. These are closely connected with the particular arrangement of apparatus used.

Given a particular monohydric alcohol and a glycol, one can readily ascertain for a given apparatus a favorable reaction schedule and the proportions of starting materials to yield the desired proportions of component parts in the end product. If in a trial there is not found the full content of monohydric alcohol or glycol components in the product, the proportion of the deficient component may readily be increased in the starting mixture. There is thus no difficulty in obtaining a final product having advantageous properties and having the composition defined by the equation and ratios stated above.

The early stages of reaction may be favorably carried through with the aid of volatile solvents, such as benzene, toluene, xylene, close-cut naphthas, chlorinated solvents, and the like. These assist in removal of water of esterification through azeotropic distillation. When they have served their purpose, they are distilled from the reaction mixture, which is then taken to its final temperature under reduced pressure.

The reaction of alcohol, glycol, and acid may be hastened by addition to the reacting mixture of small amounts (0.1% to 1%) of an acidic catalyst, such as zinc chloride, sodium acid sulfate, p-toluene sulfonic acid, etc. Air may be excluded from the reaction mixture by sweeping out the apparatus with a gas such as hydrogen or nitrogen. The reaction is started usually by heating to reflux temperatures and then continuing the heating, taking off volatile materials, including azeotropic mixtures, and reducing the pressure as rapidly as conditions will permit. At the end point of about 200° C. the pressure in the reaction vessel is preferably carried down to 1 mm. to 15 mm.

Typical methods of preparing the complex esters of this invention and data on properties are given in the following examples.

*Example 1*

There were charged to a reaction vessel equipped with stirrer and reflux condenser controlled at 100° C. with steam 202 g. of sebacic acid, 88 g. of 2-ethyl-1,3-hexanediol, and 208 g. of 2-ethylhexanol, 0.1 g. of zinc chloride being used as a catalyst. The reaction mixture was heated to maintain a moderate, steady rate of distillation with reflux of the alcohol and glycol. The condenser permitted water vapor and azeotropes to pass. The temperature at the start of refluxing was 150° C. The temperature of the batch was gradually increased until at the end of eight hours the temperature of 200° C. was attained. While the reaction mixture was held at this temperature, the pressure was gradually reduced, the rate of reduction of pressure being controlled by the rate at which distillate could be taken off through the condensing system. After sixteen hours, the pressure was reduced to 10 mm. where it was held for an hour.

Analysis of the reaction product showed a ratio of 1.19 to 0.405 to 1.0 for the 2-ethylhexanol/2-ethyl-1,3-hexanediol/sebacic acid ratio. The acid number was 1.12.

This product is an oily liquid, having viscosities of 10.17 centistokes at 210° F., 61.20 cs. at 100° F., and 9,240 cs. at −25° F. and does not freeze when held at −105° F. for 24 hours. It has a flash point of 490° F. and a fire point of 540° F. The Dean-Davis viscosity index is 139.5. When subjected to oxidation tests, there is a small increase in acid number and viscosity, but no sludge forms. Furthermore, common antioxidants effectively stabilize this product. In the Falex lubricant tester wear is 4 mg./hr. and load at seizure is 2250 lbs. Although these are better values than are obtained with mineral oil of similar viscosity, these values may be further improved by addition of wear-resisting agents and film-forming compounds.

The product is miscible with hydrocarbon oils, which may be used to give lubricants of lower or higher viscosities than that of the product alone. Thus, a mixture of 80% of a 200 pale oil and 20% of the product has a viscosity of 5.79 cs. at 210° F. and 43.9 cs. at 100° F. A mixture of 40% of the 200 pale oil and 60% of the product has a viscosity of 7.18 cs. at 210° F. and of 46.5 cs. at 100° F.

A blend of 20% of the product and 80% of a Mid-Continent bright stock (32.99 cs. at 210° F.) has a viscosity of 22.5 cs. at 210° F. and of 297.7 cs. at 100° F. A blend of 60% of the product and 40% of the same bright stock gives a mixture having viscosities of 13.4 cs. at 210° F. and 108.6 cs. at 100° F.

*Example 2*

The preparation of Example 1 was repeated with the use of 0.4 g. of zinc chloride. Heating as before was carried to 200° C. but the pressure was reduced at the end to 5 mm.

The viscosity of this product was 9.07 cs. at 210° F. Its acid number was 0.4. Its pour point was below −60° F., although it did not actually freeze at −105° F.

It was blended with dioctyl sebacate, which has been found a particularly useful ester in the lubricant field. The product (A) and this ester (B) are miscible in all proportions. Inspection data were obtained for a series of mixtures of the two materials and are reported in Table I, wherein viscosities are shown over a considerable range of temperature, viscosity-indices are given both on the Dean and Davis (D-D) and the Hardiman-Nissan (H-N) scales, and pour points are recorded as determined by the A. S. T. M. method.

*Table I*

| Consns. | | Viscosities, cs. | | | | V.-I. | | Pour Point |
|---|---|---|---|---|---|---|---|---|
| % A | % B | 210° F. | 100° F. | 0° F. | −40° F. | D-D | H-N | |
| 0 | 100 | 3.35 | 12.90 | 184.7 | 1,450 | 152 | 146 | −60 |
| 20 | 80 | 4.00 | 16.35 | 272.2 | 2,318 | 167 | 146 | −75 |
| 40 | 60 | 4.89 | 21.83 | 427.9 | 3,916 | 161 | 143 | −75 |
| 60 | 40 | 5.95 | 28.93 | 668.0 | 7,010 | 152 | 141 | −75 |
| 80 | 20 | 7.28 | 38.65 | 1,024.0 | 12,490 | 145 | 139 | −75 |
| 100 | 0 | 9.07 | 53.25 | 1,742.0 | 141,400 | 140 | 137 | −60 |

The complex esters of this invention are likewise miscible with other simple esters and with high molecular weight polyethers which have been proposed as lubricants. The combination gives considerable improvement in many properties over those of these latter components.

Repetition of the above preparation with the substitution of an equivalent weight of azelaic acid leads to a product of the same general properties and the same utility.

*Example 3*

There were charged to the reaction vessel 140 g. of 2-ethyl-2-butyl-1,3-propanediol, 332 g. of 2-ethylhexanol, and 322 g. of sebacic acid with 0.3 g. of zinc chloride added to serve as a catalyst. The reaction mixture was heated and a constant rate of distillation was maintained until water was no longer evolved. Distillation started at 150° C. batch temperature. The temperature of the reaction mixture was carried up to 200° C. within four hours and the pressure gradually reduced to 10 mm. after another eight hours.

The product obtained contained the residues of alcohol, glycol, and acid in the ratio of 0.90/0.55/1.0. It had an acid number of 1.1. Viscosities were determined as follows: At 210° F., 9.21 cs.; at 100° F., 56.72 cs.; at 0° F., 2116 cs.; and at −40° F., 29,070 cs. The viscosity index (D-D) is 136. The pour point is −80° F., but the product does not freeze at −105° F.

The substitution of azelaic acid for sebacic acid yields a product of the same general properties.

The oily liquids of this invention may be modified by solution therein of polymeric substances. They serve to body the liquids and to give exceptionally favorable viscosity-temperature relationships of the resulting solutions in many cases. Among the most effective of such additives are the acrylic resins and linear polyesters of high molecular weight.

A solution of 2.5% of a copolymer of decyl and octyl methacrylates was made in a complex ester such as described in Example 1, having a viscosity of 10.2 cs. at 210° F. The 2.5% solution had the following viscosities in centistokes: At 210° F., 15.09; at 100° F., 86.15; at 0° F., 2680; at −40° F., 40,570. The Dean-Davis viscosity index is 146.

A 5% solution of this same polymer gave the following viscosity data—at 210° F., 23.87 cs.; at 100° F., 136.1 cs.; at 0° F., 4085 cs.; and at −40° F., 534,000 cs. The viscosity index is 144.

A 3% solution of octyl polyacrylate in the same fluid gave the following viscosities in centistokes—at 210° F., 11.75; at 100° F., 69.67. The viscosity index is 141.

A 1.8% solution of a polymer from octyl methacrylate gave the following viscosities—at 210° F., 13.12 cs.; at 100° F., 72.66 cs. The viscosity index is 147.

A 3.6% solution of a polymer from lauryl methacrylate gave the following viscosities—at 210° F., 15.16 cs.; at 100° F., 83.05 cs. The viscosity index is 155.

The acrylic and methacrylic acid esters which are soluble and effective in the liquids of this invention are those from saturated aliphatic monohydric alcohols of four up to eighteen carbon atoms. Copolymers of two or more esters are useful and, in fact, often preferable. The molecular size of the various polymers may be varied greatly. The high polymers give the most marked effects while the low polymers are least influenced by shear.

Solutions of a polymer of propylene sebacate of average molecular weight of about 25,000 were made in a liquid from 2-ethylhexanol, 2-ethyl-1,3-hexanediol, and azelaic acid in which the ratio of the three condensed components was 1.05 to 0.46 to 1. The liquid had a viscosity at 210° F. of 11 cs. At 2.5% of this polymer, viscosities in centistokes were determined as 15.09 at 210° F.; 86.15 at 100° F.; 2680 at 0° F.; 40,570 at —40° F. with a viscosity index of 146.

At 10% of this polymer, viscosities in centistokes were found to be 43.88 at 210° F. and 274.2 at 100° F.

Example 4

There were charged to the reaction vessel 323 g. of sebacic acid, 140 g. of 2-ethyl-1,3-hexanediol, and 369 g. of an isononyl alcohol which consisted of an isomeric mixture of about 70% of 3,5,5-trimethylhexanol and 30% of 2-isopropyl-3,3-dimethylbutanol. Thereto was added 0.5 g. of zinc chloride to serve as a catalyst. The mixture was stirred and heated. At 158° C. distillation began. After three more hours of heating, the temperature of the batch reached 200° C. where it was maintained during the rest of the preparation. An hour after this temperature had been attained, the pressure was gradually reduced until after eleven hours of heating the pressure was lowered to 10 mm. Thereupon, the batch was stripped at about 4 mm. The product obtained was an oily liquid which had an acid number of 1.1. It had a viscosity of 10 cs. at 210° F., of 81 cs. at 100° F., and of 2500 cs. at 0° F. Its viscosity index is 140. It does not freeze at —105° F.

The fluids of this invention are useful for the preparation of greases with metallic soaps such as lithium, calcium, or aluminum stearates, or mixtures thereof.

The complex esters of this invention serve as base fluids which can be adjusted to almost any need. They may be thinned with simple esters such as dioctyl sebacate, dioctyl adipate, diheptyl azelate, dibutyl sebacate, dicapryl phthalate, polyethers including hetero-ethers, etc. They may be used in conjunction with hydrocarbons. They may be thickened with polymeric materials or metal soaps.

Whether the fluids of this invention are used alone or as one component of a mixture, they carry with them the advantages of their unique properties. Their low pour points are particularly important when taken in conjunction with their low volatility. The latter determines their high flash and fire points. These fluids have excellent viscosity properties and by themselves suffer no loss in viscosity from shear. The viscosity behavior at low temperatures is exceptionally good, since the viscosity-temperature curve is almost linear. There is absent the so-called "low temperature hook" which seems characteristic of most liquids which have been suggested to serve as lubricants. The fluids provide good lubricating action and support greater loads than hydrocarbon oils of the same viscosity or pour point ranges. In short, they possess a combination of properties which recommend them highly for a great variety of applications.

The reactants which are condensed in proper proportion to produce the oily, bland products of this invention possessing the properties just described are conveniently summarized by type formulae. The glycols which are used are defined by the formula HOR'OH where R' is a branched alkylene group of seven to ten carbon atoms. The monohydric alcohols fall under the structure R"OH, where R" is a branched alkyl group of six to nine carbon atoms. The acids have the formula $HOOC(CH_2)_mCOOH$ where $m$ is an integer from seven to eight inclusive.

The products which result from these reactants condensed within the specified proportions to an acid number approaching zero are a complex mixture, the apparent or average molecular weight of which rests on choice of components and proportions. The distribution of individual molecular sizes in a given product may be represented by a rather peaked bell-shaped curve or probability curve. The relative location of the peak of this curve varies with proportions used but products prepared from the recited ratios of the designated components all possess the unusual properties which have been related above and which distinguish them from condensates known heretofore.

We claim:

1. A bland, oily product which is a condensate of (1) a monohydric, saturated, non-tertiary, aliphatic alcohol of six to nine carbon atoms in branched chain arrangement, (2) an acyclic, saturated, non-tertiary glycol of seven to ten carbon atoms in branched chain arrangement, and (3) a dibasic acid selected from the class consisting of azelaic and sebacic acids, the molar proportions of residues in said condensate from said alcohol, said glycol, and said acid being within the ratios of 1.2 to 0.4 to 1 and 0.8 to 0.6 to 1, and being present in proportions fulfilling the equation $$x+2y=2z$$

where $x$ represents moles of said alcohol residue, $y$ represents moles of said glycol residue, and $z$ represents moles of said acid residue.

2. A bland, oily product which is a condensate of (1) a monohydric, saturated, primary aliphatic alcohol of six to nine carbon atoms in branched chain arrangement, (2) an acyclic, saturated, non-tertiary 1,3-alkanediol of seven to ten carbon atoms in branched chain arrangement, and (3) sebacic acid, the molar proportions of residues in said condensate from said alcohol, 1,3-alkanediol, and said acid being within the ratios of 1.2 to 0.4 to 1 and 0.8 to 0.6 to 1, and being present in proportions satisfying the equation $$x+2y=2z$$

where $x$ represents moles of alcohol residue, $y$ represents moles of 1,3-alkanediol residue, and $z$ represents moles of sebacic acid residue.

3. A bland, oily product which is a condensate of (1) a monohydric, saturated, primary, aliphatic alcohol of six to nine carbon atoms in branched chain arrangement, (2) 2-ethyl-1,3-hexanediol, and (3) sebacic acid, the molar proportions of residue in said condensate from said alcohol, 2-ethyl-1,3-hexanediol, and said acid being within the ratios of 1.2 to 0.4 to 1 and 0.8 to 0.6 to 1, and being present in proportions satisfying the equation $$x+2y=2z$$

wherein $x$ represents moles of alcohol residue, $y$ represents moles of 2-ethyl-1,3-hexanediol residue, and $z$ represents moles of sebacic acid residue.

4. The product of claim 3 in which the monohydric alcohol is 2-ethylhexanol.

5. A bland, oily product which is a condensate of (1) a monohydric, saturated, primary, aliphatic alcohol of six to nine carbon atoms in branched chain arrangement, (2) 2-ethyl-2-butyl-1,3-propanediol, and (3) sebacic acid, the molar proportions of residues of alcohol, 2-ethyl-2-butyl-1,3-propanediol, and sebacic acid present in said condensate being within the ratios of 1.2 to 0.8 to 1 and 0.8 to 0.6 to 1, and being present in proportions satisfying the equation $$x+2y=2z$$

wherein $x$ represents moles of said alcohol, $y$ represents moles of 2-ethyl-2-butyl-1,3-propanediol, and $z$ represents moles of sebacic acid.

6. The product of claim 5 in which the monohydric alcohol is 2-ethylhexanol.

7. A process of preparing bland, oily liquids having low freezing points and high flash and fire points, which comprises mixing together a monohydric, saturated, non-tertiary, aliphatic alcohol of six to nine carbon atoms in branched chain arrangement, an acyclic, saturated, non-tertiary glycol of seven to ten carbon atoms in branched chain arrangement, and a dibasic acid selected from the class consisting of azelaic and sebacic acids, the equivalents of said alcohol and glycol being in excess of the acid, reacting by condensing together said alcohol, glycol, and acid, distilling off excess alcohol and glycol, carrying the temperature of the reaction mixture to 195° C. to 205° C. and reducing the pressure below 30 mm., continuing the reaction until the acid number is below two, the molar proportions of alcohol to glycol to acid in the condensate come within the ratios of 1.2 to 0.4 to 1 and 0.8 to 0.6 to 1, and the moles of said alcohol, $x$, the moles of said glycol, $y$, and the moles of said acid, $z$, all condensed together are in the relation expressed by the equation $$x+2y=2z$$

8. A process of preparing bland, oily liquids having low freezing points and high flash and fire points, which comprises mixing together (1) a monohydric, saturated, primary, aliphatic alcohol of six to nine carbon atoms in branched chain arrangement, (2) an acyclic, saturated, non-tertiary 1,3-alkanediol of seven to ten carbon atoms in branched chain arrangement, and (3) sebacic acid, the equivalents of said alcohol and said 1,3-alkanediol being in excess of the said acid, reacting by condensing together said alcohol, said 1,3-alkanediol, and said acid, distilling off excess alcohol and glycol, carrying the temperature of the reaction mixture to 195° C. to 205° C. and reducing the pressure below 30 mm., continuing the reaction until the acid number is below two, the molar proportions of alcohol to 1,3-alkanediol to acid in the condensate come within the ratios of 1.2 to 0.4 to 1 and 0.8 to 0.6 to 1, and the moles of said alcohol, $x$, the moles of said 1,3-alkanediol, $y$, and the moles of said acid, $z$, all condensed together are in the relation expressed by the equation $$x+2y=2z$$

9. A process of preparing bland, oily liquids having low freezing points and high flash and fire points, which comprises mixing together (1) a monohydric, saturated, primary, aliphatic alcohol of six to nine carbon atoms in branched chain arrangement, (2) 2-ethyl-1,3-hexanediol, and (3) sebacic acid, the equivalents of said alcohol and 2-ethyl-1,3-hexanediol being in excess of the said acid, reacting by condensing together said alcohol, 2-ethyl-1,3-hexanediol, and sebacic acid, distilling off excess alcohol and 2-ethyl-1,3-hexanediol, carrying the temperature of the reaction mixture to 200° C. and reducing the pressure below 30 mm., continuing the reaction until the acid number is below two, the molar proportions of alcohol to 2-ethyl-1,3-hexanediol to acid are within the ratios 1.2 to 0.4 to 1 and 0.8 to 0.6 to 1, and the moles of said alcohol, $x$, the moles of 2-ethyl-1,3-hexanediol, $y$, and the moles of sebacic acid, $z$, all condensed together, are in the relation expressed by the equation $$x+2y=2z$$

10. The process of claim 9 in which the alcohol is 2-ethylhexanol.

11. A process of preparing bland, oily liquids having low freezing points and high flash and fire points, which comprises mixing together (1) a monohydric, saturated, primary, aliphatic alcohol of six to nine carbon atoms in branched chain arrangement, (2) 2-ethyl-2-butyl-1,3-propanediol, and (3) sebacic acid, the equivalents of said alcohol and 2-ethyl-2-butyl-1,3-propanediol being in excess of the said acid, reacting by condensing together said alcohol, 2-ethyl-2-butyl-1,3-propanediol, and sebacic acid, distilling off excess alcohol and 2-ethyl-2-butyl-1,3-propanediol, carrying the temperature of the reaction mixture to 200° C. and reducing the pressure below 30 mm., continuing the reaction until the acid number is below two, the molar proportions of alcohol to 2-ethyl-2-butyl-1,3-propanediol to acid are within the ratios 1.2 to 0.4 to 1 and 0.8 to 0.6 to 1, and the moles of said alcohol, $x$, the moles of 2-ethyl-2-butyl-1,3-propanediol, $y$, and the moles of sebacic acid, $z$, all condensed together, are in the relation expressed by the equation $$x+2y=2z$$

12. The process of claim 11 in which the alcohol is 2-ethylhexanol.

ELLINGTON M. BEAVERS.
RICHARD F. CONYNE.

No reference cited.